E. Smith.
Harvester Rake.

No. 55380          Patented June 5, 1866.

Witnesses:
Emeline J. Brown
Seraphina Brown

Ephraim Smith,
By his atty,,
J. S. Brown.

UNITED STATES PATENT OFFICE.

EPHRAIM SMITH, OF CLINTON, PENNSYLVANIA.

IMPROVEMENT IN RAKE ATTACHMENTS TO HARVESTERS.

Specification forming part of Letters Patent No. 55,380, dated June 5, 1866.

*To all whom it may concern:*

Be it known that I, EPHRAIM SMITH, of Clinton, in the county of Allegheny and State of Pennsylvania, have invented an Improved Rake for Harvesters; and I do hereby declare that the following is a full and exact description thereof, reference being had to the accompanying drawings, making part of this specification—

Figure 1:
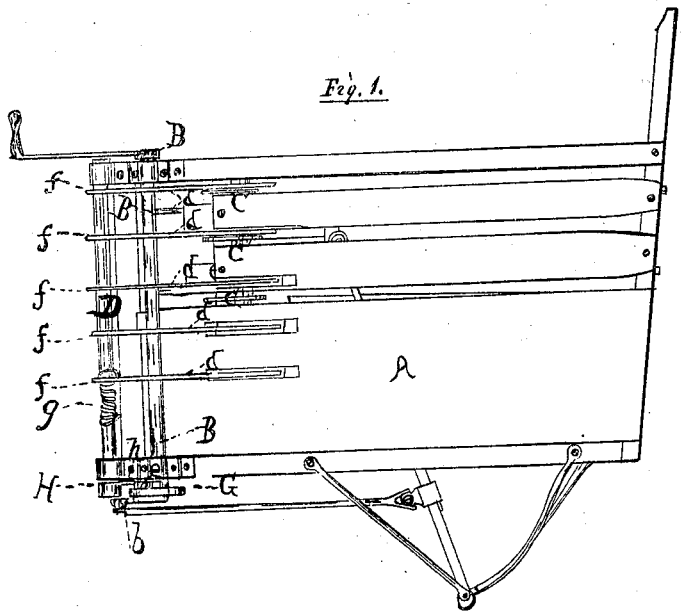
Figure 2:
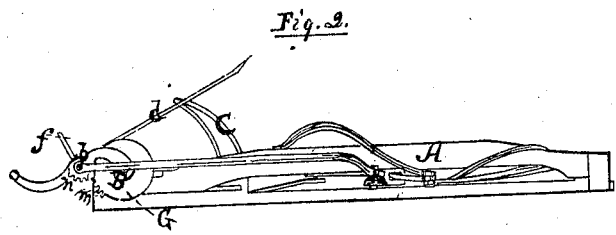
Figure 3:
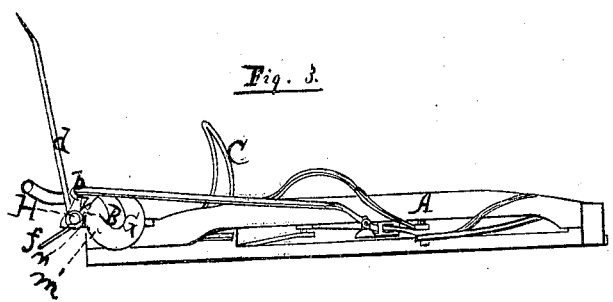

Figure 1 being a plan of the platform of a harvester provided with my improvement in the raking apparatus; Fig. 2, a rear view thereof, showing the raking apparatus in one position; Fig. 3, a similar view, showing the raking apparatus in another position.

Like letters designate corresponding parts in all of the figures.

The platform of a harvester is represented by A in the drawings, there being transverse openings in the same, through which the teeth C C C of a reciprocating rake pass, the said teeth projecting upward in an upright position when going in the proper direction to gather up and discharge the grain, but being so arranged as to descend and be depressed beneath the surface of the platform when making its return motion.

The movements and arrangement of this rake are similar to those secured by several Letters Patent issued to A. B. Smith, of Clinton, Allegheny county, Pennsylvania, and hence I lay no claim to any parts thereof, and need not describe them here.

The nature of my invention consists in the employment and peculiar construction, arrangement, and operation of a set of lifting-rods, *d d d*, severally provided with guard-fingers *f f f*, projecting upward from their outer ends, substantially as represented in the drawings, the object of this device being to receive the bunches or gavels of grain as they are delivered by the rake, and to quickly tilt them off from the machine, and to hold them in a compact state till finally dropped suddenly upon the ground. These lifting-rods are attached to a rock-shaft, D, by the movements of which the rods are first laid flat upon the platform, as indicated in Fig. 1, then raised somewhat, or to the top of the rake-teeth, while the rake itself is still operating on the gavels, as shown in Fig. 2, and finally turned over by a rapid movement of the rock-shaft till they are in a position to finally cast off the gavels on the ground, as represented in Fig. 3.

It will be seen that the guard-fingers *f f f* hold the grain all upon the lifting-rods till the last moment before the whole is cast off by the rapid motion of the rock-shaft D. The motions of the rock-shaft D to produce these required movements of the lifting-rods are produced by the following arrangement or the substantial equivalent thereof:

The main shaft B, by which the rake itself is actuated (through the crank *b* thereon) is provided with a disk or wheel, G, at one end, and a smaller disk or wheel, H, is secured to the end of the rock-shaft D in a position opposite to the disk or wheel G. Upon one face of the disk or wheel G is a cam-pin, *i*, Fig. 1, which is so located in relation to a cam-projection, *h*, Figs. 1 and 3, on the rock-shaft D, or its disk or wheel H, as at the proper time to strike said cam-projection and partially turn the said rock-shaft so as to lift the rods *d d d* a certain distance, as indicated in Fig. 2. There is then a set of a few gear-teeth, *m*, on the periphery of the disk or wheel G, and a corresponding set of teeth, *n*, on the periphery of the disk or wheel H. These are so situated in relation to one another that they will gear together before the cam-pin *i* ceases to act on the cam-projection *h*. Thus, then, the motion of the main shaft B continues to turn the rock-shaft D rapidly by said gear-teeth till they pass each other and become ungeared, when a torsional spring, *g*, or its equivalent, on the rock-shaft immediately turns the same back, and lays the lifting-rods *d d d* back flat upon the platform A again till the next revolution of the main shaft B repeats the movement.

What I claim as my invention, and desire to secure by Letters Patent, is—

1. The lifting-rods *d d d*, when provided with the guard-fingers *f f f*, projecting upward from their outer ends, near the shaft on which they turn, substantially as and for the purpose herein specified.

2. In combination with the above, the arrangement of the disk or wheel G, with its cam-pin and gear-teeth, and the disk or wheel H, with its cam-projection and gear-teeth, for giving the required movements to the lifting-rods, substantially as herein set forth.

The above specification of my improved raker for raking grain signed by me this 21st day of February, 1865.

EPHRAIM SMITH.

Witnesses:
 BARTON RICKETSON,
 LEONARD S. JOHNS.